United States Patent
Rosenberger et al.

(10) Patent No.: US 10,737,710 B2
(45) Date of Patent: Aug. 11, 2020

(54) EVALUATION UNIT FOR A SENSOR ARRANGEMENT FOR RAILWAY MONITORING, SENSOR ARRANGEMENT AND CORRESPONDING METHOD

(71) Applicant: Frauscher Sensortechnik GmbH, St. Marienkirchen (AT)

(72) Inventors: Martin Rosenberger, Eggerding (AT); Michael Thiel, St. Florian Am Inn (AT)

(73) Assignee: FRAUSCHER SENSORTECHNIK GmbH, St. Marienkirchen (AT)

( * ) Notice: Subject to any disclaimer, the term of this patent is extended or adjusted under 35 U.S.C. 154(b) by 155 days.

(21) Appl. No.: 15/273,625

(22) Filed: Sep. 22, 2016

(65) Prior Publication Data

US 2018/0029619 A1   Feb. 1, 2018

(30) Foreign Application Priority Data

Jul. 27, 2016   (EP) ..................................... 16181459

(51) Int. Cl.
*B61L 25/02* (2006.01)
*B61L 23/04* (2006.01)
(Continued)

(52) U.S. Cl.
CPC .............. *B61L 25/025* (2013.01); *B61L 1/00* (2013.01); *B61L 1/163* (2013.01); *B61L 23/041* (2013.01);
(Continued)

(58) Field of Classification Search
CPC ............................. B61L 25/021; B61L 25/025
See application file for complete search history.

(56) References Cited

U.S. PATENT DOCUMENTS

| | | |
|---|---|---|
| 5,330,136 A | 7/1994 | Colbaugh |
| 2012/0217351 A1* | 8/2012 | Chadwick ............. B61L 25/021 246/169 R |

(Continued)

FOREIGN PATENT DOCUMENTS

| | | |
|---|---|---|
| DE | 3537588 A1 | 4/1987 |
| DE | 102004041803 A1 | 3/2006 |

(Continued)

OTHER PUBLICATIONS

Rosenberger, M., et al., "Distributed Acoustic Sensing as a base technology for railway applications", Signalling + Datacommunication (108), Sep. 2016, pp. 73-84.

*Primary Examiner* — Herbert K Roberts
(74) *Attorney, Agent, or Firm* — Morgan, Lewis & Bockius LLP

(57) ABSTRACT

An evaluation unit 10 for a sensor arrangement for railway monitoring is described, the evaluation unit 10 comprising a connection to a position sensor 11 and a connection to a tracking sensor 12. The position sensor 11 is capable of detecting rail vehicles 19 passing over the position of the position sensor 11 on a railway track 14 and provides a position output signal 15. The tracking sensor 12 comprises a fibre optic sensor 16, which is capable of detecting the position of noise along the railway track 14 and the tracking sensor 12 provides a tracking output signal 18. The evaluation unit 10 provides an output signal 13 that depends on the position output signal 15 and the tracking output signal 18. Further, a sensor arrangement for railway monitoring and a method for evaluation of railway monitoring signals are described.

16 Claims, 6 Drawing Sheets

(51) Int. Cl.
*B61L 27/00* (2006.01)
*B61L 1/00* (2006.01)
*B61L 1/16* (2006.01)
*G01D 5/26* (2006.01)

(52) U.S. Cl.
CPC ........... *B61L 23/044* (2013.01); *B61L 25/021* (2013.01); *B61L 25/023* (2013.01); *B61L 25/026* (2013.01); *B61L 25/028* (2013.01); *B61L 27/0088* (2013.01); *B61L 27/0094* (2013.01); *G01D 5/268* (2013.01)

(56) References Cited

U.S. PATENT DOCUMENTS

2015/0013465 A1* 1/2015 Godfrey ................ B61L 23/044
73/655
2018/0186384 A1* 7/2018 Fisk ...................... B61L 25/021

FOREIGN PATENT DOCUMENTS

| | | | | |
|---|---|---|---|---|
| DE | 102004012169 B4 | 1/2008 | | |
| DE | 102004012170 B4 | 1/2008 | | |
| DE | 102004012167 B4 | 7/2011 | | |
| DE | 102016210968 A1 * | 12/2017 | ............ | B61L 23/042 |
| EP | 1582430 A1 | 10/2005 | | |
| EP | 2883022 A2 | 6/2015 | | |
| WO | WO-2017220304 A1 | 12/2017 | | |

\* cited by examiner

EVALUATION UNIT FOR A SENSOR ARRANGEMENT FOR RAILWAY MONITORING, SENSOR ARRANGEMENT AND CORRESPONDING METHOD

The present application relates to an evaluation unit for a sensor arrangement for railway monitoring, to a sensor arrangement for railway monitoring and a method for evaluation of railway monitoring signals.

BACKGROUND OF THE INVENTION

In order to monitor the movement of rail vehicles on railway tracks, rail vehicles can be detected at fixed positions along the railway track. The fixed position sensors can, for example, provide the information if a rail vehicle passes their fixed position. By employing two or more position sensors, moving rail vehicles can be detected at several positions. With this, it can be determined if a rail vehicle is located in a certain track area between two position sensors. By evaluating the output signals of the two position sensors, certain track areas can be determined to be clear of a rail vehicle or occupied by a rail vehicle.

By employing at least two position sensors in close proximity, the velocity and the direction of travel of a moving rail vehicle can be determined. By counting the number of axles of a rail vehicle passing over a position sensor the length of a rail vehicle can be determined. Moreover, it is possible to determine on which track a rail vehicle is moving by positioning position sensors on each track.

However, with these fixed position sensors it is not possible to obtain any information about the movement of a rail vehicle between two position sensors. Thus, it is only possible to obtain information about the rail vehicle such as the velocity or the direction of travel at the fixed positions of the position sensors.

SUMMARY OF THE INVENTION

In one embodiment of the evaluation unit for a sensor arrangement for railway monitoring, the evaluation unit comprises a connection to a position sensor capable of detecting rail vehicles passing over the position of the position sensor on the railway track and providing a position output signal. The position sensor can be located at a fixed position at or on the railway track. The position output signal can, for example, comprise the information if a rail vehicle is passing over the position of the position sensor or if a rail vehicle is located at the position of the position sensor. The position sensor can, for example, also provide information about the velocity of a rail vehicle and about the direction of travel of a rail vehicle.

In one embodiment the evaluation unit for a sensor arrangement for railway monitoring comprises a connection to a tracking sensor which comprises a fibre optic sensor which is capable of detecting the position of noise along the railway track and which provides a tracking output signal. The tracking sensor can comprise a fibre which is arranged along the railway track, which means that it is located in close proximity to the railway track. In close proximity means that the tracking sensor is capable of detecting noise caused by, for example, a passing rail vehicle. The tracking sensor can comprise a fibre optic sensor which is connected to an optical fibre. A light pulse from a light source can be sent into the optical fibre where it is scattered at impurities or other scatter sites. This means that a part of the light is reflected to the light source. The scattering depends on physical changes in the optical fibre which can be caused, for example, by noise in close proximity to the optical fibre.

The tracking sensor is capable of detecting the position of the noise along the railway track. Noise can be structure-borne noise, soundwaves or vibrations from the environment around the optical fibre. The tracking output signal can provide information about the position of detected noise along the railway track. The noise detected by the tracking sensor can be, for example, caused by a rail vehicle moving along the railway track.

In one embodiment the evaluation unit provides an output signal that depends on the position output signal and the tracking output signal. By combining the information provided by the position output signal and the tracking output signal the evaluation unit can provide the current position of a rail vehicle on the railway track.

By combining the information provided by the position output signal and the tracking output signal, for example the current position of every rail vehicle on the railway track can be determined without the need for additional components on the rail vehicles. Especially on international railway tracks, the rail vehicles can be detected without additional components on the rail vehicles. With this, complications resulting from different standards in different countries are avoided. Furthermore, the position of a rail vehicle cannot only be determined at the fixed positions of the position sensors, but the current position of a rail vehicle can also be determined between predefined positions and specific sections of the railway track.

In one embodiment the evaluation unit for a sensor arrangement for railway monitoring comprises a connection to at least one position sensor and to at least one tracking sensor, and the evaluation unit provides an output signal that depends on the position output signal and the tracking output signal.

In one embodiment the evaluation unit is capable of providing the current position of a rail vehicle on the railway track by combining the information provided by the position output signal and the tracking output signal. This means, that the position of a rail vehicle cannot only be determined at the position of a position sensor, but also if the rail vehicle is between the positions of two or more position sensors or at any position on the railway track. Thus, the current position of a rail vehicle can be determined in real time within the accuracy of the measurement. Combining the information provided by the position output signal and the tracking output signal means that information detected only by the position sensor is combined with information only detected by the tracking sensor. With this, for example, the timetable of rail vehicles can be analysed and adjusted. Furthermore, safety can be improved, for example in the area of level crossings.

In one embodiment the evaluation unit provides the information on which track a rail vehicle is moving in the case of more than one track arranged in parallel, each track having at least one position sensor assigned thereto. In the case of more than one track arranged in parallel the tracking sensor is not capable of clearly determining on which track a rail vehicle is moving. Therefore, position sensors can be arranged on each track providing the information on which track a rail vehicle is moving. By combining the information of the position sensor and the tracking sensor also in the case of more than one track arranged in parallel, the current position of a rail vehicle on the railway track can be determined.

In one embodiment the evaluation unit provides information about the current position of a rail vehicle between at least two predefined positions. Predefined positions on the railway track can be, for example, position sensors or stations.

In one embodiment the evaluation unit provides information about the current position of a rail vehicle within a specific section of the railway track. Specific sections of the railway track can be, for example, within stations, between stations, between position sensors or in tunnels.

In one embodiment the evaluation unit provides information about the current velocity of a rail vehicle. The current velocity can be determined, for example, by two position sensors arranged in close proximity by determining the different times at which the rail vehicle is passing by at the two position sensors. The current velocity of a rail vehicle can also be determined from the first derivative of a tracking signal.

In one embodiment the evaluation unit provides information about the current acceleration of a rail vehicle. The current acceleration of a rail vehicle can, for example, be determined by the second derivative of a tracking signal.

In one embodiment the evaluation unit provides information about the current direction of travel of a rail vehicle. The direction of travel of a rail vehicle can, for example, be determined by two position sensors in close proximity by comparing the different times at which the rail vehicle is passing at the two position sensors.

In one embodiment the evaluation unit provides information about the position of a wheel flat of a rail vehicle. A wheel flat of a rail vehicle can be detected by evaluating the tracking signal since a wheel flat produces a different signature of the tracking signal than a rail vehicle without a wheel flat.

In one embodiment the evaluation unit provides information about the position of a rail break along the railway track the rail vehicle is moving on. In one embodiment the position of a rail break can also be determined by evaluating the tracking output signal. Furthermore, the position of loose track joints can be determined.

In one embodiment the evaluation unit provides information about the position of other noise or vibrations along the railway track the rail vehicle is moving on. Other noise on the railway track or close by can comprise movements of vehicles, footsteps of persons, manual or machine digging, working parties, movement of animals or environmental events such as rock falls or landslides. Other examples are theft or vandalism.

In one embodiment the evaluation unit provides information about on which track the rail vehicle is moving in case of more than one track arranged in parallel. In order to determine on which track a rail vehicle is moving, for example at least one position sensor can be arranged per track.

In one embodiment the evaluation unit provides information about the number of axles of the rail vehicle. The position sensor can, for example, be capable of detecting the axles of a rail vehicle.

In one embodiment the evaluation unit provides information about the diameter of the axles of the rail vehicle. The position sensor can, for example, be capable of detecting the diameter of the axles of the rail vehicle.

In one embodiment the evaluation unit provides information about the length of the rail vehicle. The length of the rail vehicle can, for example, be determined by counting the axles of the rail vehicle.

In one embodiment the evaluation unit provides information about the temperature at the position of the position sensor. For example, the temperature can be measured by the position sensor and is related to the temperature of the rail.

With the information provided by the evaluation unit an improved monitoring of the railway track and movement of rail vehicles is possible. Therefore, safer and more efficient railway traffic can be enabled.

In one embodiment the evaluation unit provides a further output signal that depends only on the position output signal of at least one position sensor and wherein the further output signal is compliant to safety integrity level requirements. The further output signal can, for example, comprise information on the direction of travel of a rail vehicle and on which track a rail vehicle is moving. The further output signal can, for example, also provide the information if a rail vehicle passed the position of a position sensor. With this, it can be determined if a rail vehicle is positioned in a certain track area. This means that it can be determined if a certain track area is occupied by a rail vehicle or if it is clear. With the further output signal being compliant to safety integrity level requirements, the sensor arrangement can be employed for safe railway monitoring.

In one embodiment the sensor arrangement for railway monitoring comprises the evaluation unit, at least one position sensor with a position sensor output and at least one tracking sensor with a tracking sensor output. The evaluation unit is connected to the position sensor output and the tracking sensor output. The evaluation unit can combine signals provided by the position sensor and the tracking sensor to provide the current position of a rail vehicle on the railway track.

In one embodiment of the sensor arrangement for railway monitoring, the position sensor comprises one or more inductive sensors. An inductive sensor can be capable of detecting a change of a magnetic field induced by metal moving in the magnetic field. The metal moving in the magnetic field can be, for example, the wheel of a rail vehicle. If the position sensor comprises at least two inductive sensors, for example the velocity and the direction of travel of the rail vehicle can be determined. Furthermore, in case of failure of a sensor it is safer to employ at least two inductive sensors.

In one embodiment of the sensor arrangement for railway monitoring, the position sensor comprises one or more of a capacitive sensor, a mechanical sensor, an optical sensor, a strain gage sensor, a piezoelectric sensor or a radar sensor.

In one embodiment of the sensor arrangement for railway monitoring, the fibre optic sensor detects light, in particular laser light, that scatters in an optical fibre where the back scattered signal indicates the position of noise along the optical fibre such that the position of a rail vehicle on the railway track and of other noise on or along the railway track can be determined. Noise can be, for example structure-borne noise, sound waves or vibrations from the environment around the optical fibre.

In one embodiment of the sensor arrangement for railway monitoring the tracking sensor comprises a distributed acoustic sensor. This means the tracking sensor can comprise the light source, for example a laser, where light pulses are sent into an optical fibre. A small part of the light is reflected back to the light source since the light is scattered at scatter sites, as for example impurities in the optical fibre which can be natural or artificial. Changes in the backscattered signal are related to physical changes in the optical fibre which can be caused by noise, structure-borne noise, vibrations or soundwaves along the optical fibre. The optical fibre can be arranged in close proximity to the railway track such that the tracking sensor is capable of detecting noise along the railway track. The noise along the railway track can be caused, for example, by a moving rail vehicle, people or construction work. By evaluating the backscattered signal, the location of the noise along the optical fibre can be determined. With this, vibrations and noise on and around the railway track can be monitored in real time. Therefore, movement of rail vehicles, of persons or animals as well as environmental events can be monitored.

In one embodiment of the sensor arrangement for railway monitoring the tracking sensor comprises a pulsed signal source and/or an optical fibre where data detected by the position sensor is transmitted to the evaluation unit via the optical fibre and the tracking sensor. The pulsed signal source can be, for example, a laser. The position sensor can be connected to the optical fibre in such a way that data detected by the position sensor can be transmitted by the optical fibre. The data detected by the position sensor can, for example, be transmitted to the optical fibre by an electrically controlled piezo element. The data detected by the position sensor can be encoded, for example, by frequency modulation, before transmitting the data via the optical fibre. The data can be encoded in order to transmit more information. With this, a fast transmission of the data detected by the position sensor can be enabled and only one optical fibre is required for the sensor arrangement. Furthermore, the test signal can be provided in order to provide a status indicator for the position sensor.

In one embodiment of the sensor arrangement for railway monitoring, in the tracking sensor a test signal is fed into an optical fibre and the test signal is evaluated in order to provide a status indicator. For example, with the test signal the measurement can be calibrated and the attenuation of the signal can be determined.

In one embodiment the sensor arrangement for railway monitoring comprises at least two sub-evaluation units providing at least one output signal each. The outputs of the sub-evaluation units are connected with each other where one of them is bidirectional. Each sub-evaluation unit is connected with a position sensor. At least one position sensor is connected with the evaluation unit via a sub-evaluation unit. At least one sub-evaluation unit provides a combined output signal which depends on the output signals of the at least two sub-evaluation units. With this, information provided by two or more position sensors can be combined by a sub-evaluation unit. For example for a section of the railway track between two position sensors, the sub-evaluation unit can provide information about the occupancy of the section of railway track. If only the first position sensor in the section of railway track detected a passing rail vehicle, the sub-evaluation unit can provide the information that this particular section of railway track is occupied. If also the second position sensor in this particular section of railway track detected the passing rail vehicle, the sub-evaluation unit can provide the information that this particular section of railway track is clear again.

In one embodiment the sensor arrangement for railway monitoring comprises at least two evaluation units and an application unit. The application unit is connected to outputs of the at least two evaluation units, it comprises at least one application unit output and it evaluates the information provided by the at least two evaluation units. With this, the application unit provides an overview of the sensors in the sensor arrangement. The application unit can add further information and it can output information. For example the application unit can provide information to a user and it enables to optimize timetable management and train speed management.

In one embodiment the method for evaluation of railway monitoring signals comprises the steps of detecting a passing rail vehicle at at least one position along the railway track by a position sensor providing at least one position output signal and of detecting the position of noise and the rail vehicle along the railway track with the tracking sensor. The tracking sensor comprises a fibre optic sensor and an optical fibre which is arranged along the railway track such that the tracking sensor is capable of detecting the position of noise along the railway track. The tracking sensor provides a tracking output signal. The method for evaluation of railway monitoring signals further comprises providing the current position of the rail vehicle by combining the position output signal and the tracking output signal.

Thus, the current position of a rail vehicle can be determined in real time within the accuracy of the measurement. Combining the information provided by the position output signal and the tracking output signal means that information detected only by the position sensor is combined with information only detected by the tracking sensor. With this, the current position of every rail vehicle on the railway track can be determined without the need for additional components on the rail vehicles. Especially on international railway tracks, the rail vehicles can be detected without additional components on the rail vehicles. With this, complications resulting from different standards in different countries are avoided. Furthermore, the position of a rail vehicle cannot only be determined at the fixed positions of the position sensors, but the current position of a rail vehicle can also be determined between predefined positions and specific sections of the railway track.

In one embodiment of the method for evaluation of railway monitoring signals the position sensor comprises two sensors capable of detecting the direction of travel of rail vehicles passing over the position of the position sensor. The two sensors can be, for example, inductive sensors. In one embodiment the position output signal of the position sensor comprising two sensors is compliant to safety integrity level requirements. With this, it can be determined if a rail vehicle is positioned in a certain track area. This means that it can be determined if a certain track area is occupied by a rail vehicle or if it is clear.

In one embodiment of the method for evaluation of railway monitoring signals the evaluation unit provides at least one of the following features:
current position of a rail vehicle between at least two predefined positions,
current position of a rail vehicle within a specific section of the railway track,
current velocity of a rail vehicle,
current acceleration of a rail vehicle,
current direction of travel of a rail vehicle,
position of a wheel flat of a rail vehicle,
position of a rail break along the railway track the rail vehicle is moving on,
position of other noise or vibrations along the railway track the rail vehicle is moving on,
on which track the rail vehicle is moving in case of more than one track arranged in parallel,
the number of axles of the rail vehicle,
the diameter of the axles of the rail vehicle,
the length of the rail vehicle, or
the temperature at the position of the position sensor.

With the information provided by the evaluation unit an improved monitoring of the railway track and movement of rail vehicles is possible. Therefore, safer and more efficient railway traffic can be enabled.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1A:
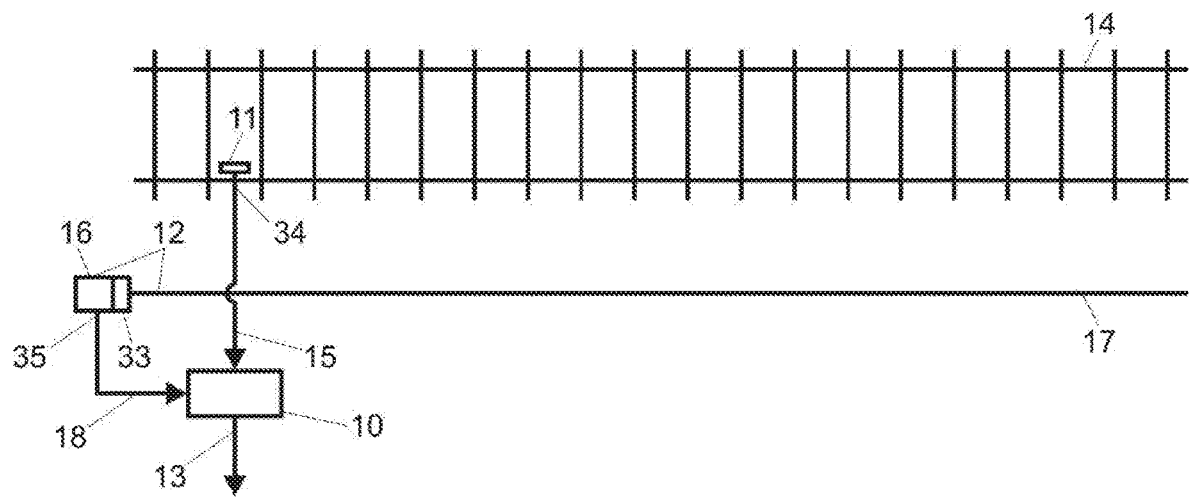
FIGS. 1A and 1B show exemplary embodiments of the sensor arrangement for railway monitoring.

FIG. 1A shows an exemplary embodiment of the sensor arrangement for railway monitoring comprising a position sensor 11 and a tracking sensor 12. At least one position sensor 11 is arranged at a railway track 14 in such a way that the position sensor 11 can detect rail vehicles 19 passing over the position of the position sensor 11. A position sensor output 34 is connected with an evaluation unit 10. The position sensor 11 provides a position output signal 15 to the evaluation unit 10. The tracking sensor 12 comprises a fibre optic sensor 16, a light source 33, which can be a pulsed signal source, an optical fibre 17 and a tracking sensor output 35. The light source 33 can send light pulses into the optical fibre 17 and the backscattered signal can be detected by the fibre optic sensor 16. The optical fibre 17 is arranged along the railway track 14 and it is arranged in close proximity to the railway track 14 such that the tracking sensor 12 is capable of detecting the position of noise along the railway track 14. The tracking sensor output 35 is connected with the evaluation unit 10 and provides a tracking output signal 18 to the evaluation unit 10. The evaluation unit 10 provides an output signal 13 that depends on the position output signal 15 and the tracking output signal 18. With this, the evaluation unit 10 can provide the current position of a rail vehicle 19 on the railway track 14.

Figure 1B:
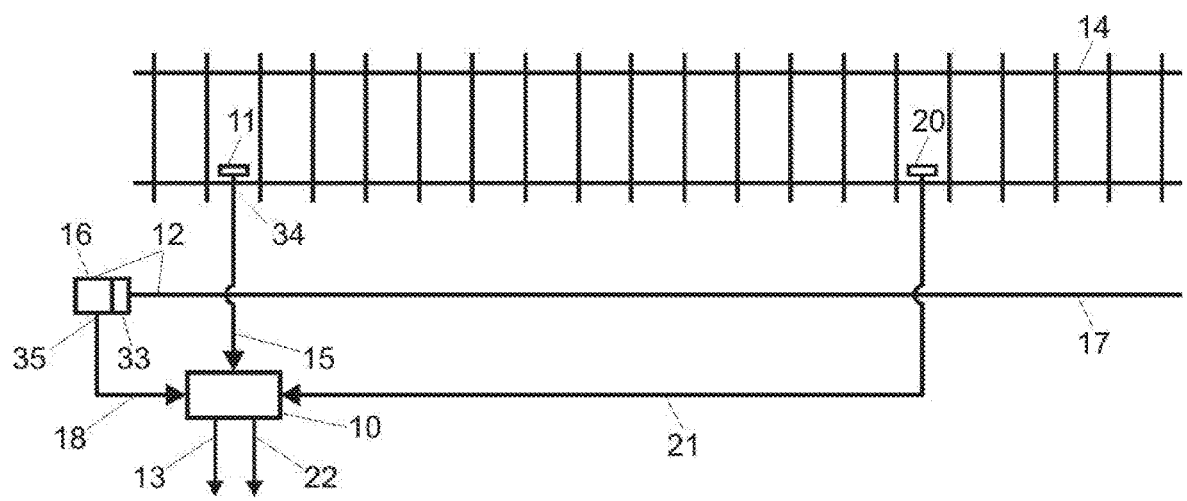

FIG. 1B shows an exemplary embodiment of the sensor arrangement for railway monitoring comprising two position sensors 11 and a tracking sensor 12. Both position sensors 11 and the tracking sensor 12 are connected with the evaluation unit 10. The first position sensor 11 provides a first position output signal 15 to the evaluation unit 10. The second position sensor 20 provides a second position output signal 21 to the evaluation unit 10. With this, the current position of a rail vehicle 19 between two predefined positions, for example between the two position sensors 11 and 20, can be provided by the evaluation unit 10. The evaluation unit 10 can provide a further output signal 22 which only depends on the first position output signal 15 and the second position output signal 21. The further output signal 22 can be compliant to safety integrity level requirements.

Figure 2A:
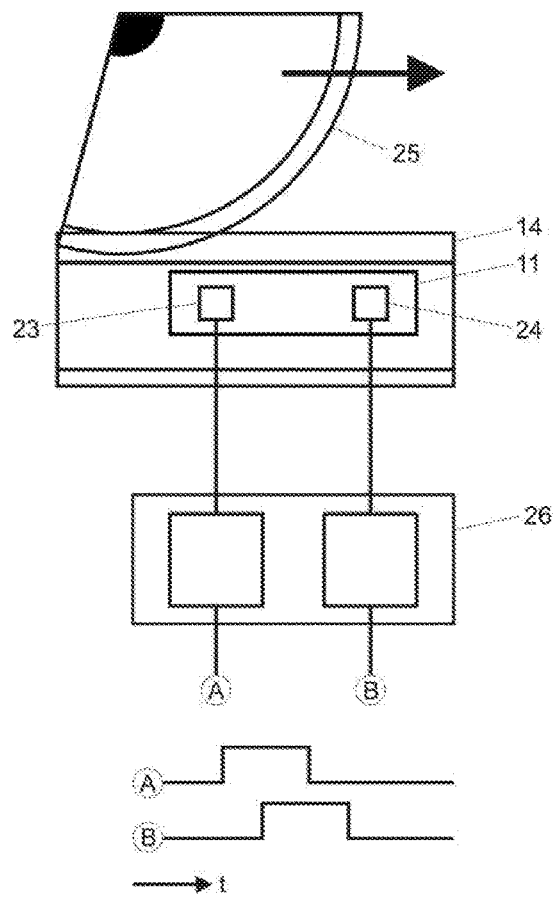
FIGS. 2A and 2B show the working principle of an exemplary embodiment of a position sensor.

FIG. 2A shows the working principle of an exemplary embodiment of a position sensor 11. The position sensor 11 can be mounted at a railway track 14. In this embodiment the position sensor 11 comprises two sensors 23, 24. Both sensors 23, 24 are capable of detecting a passing rail vehicle 19. The two sensors 23, 24 can, for example, comprise inductive sensors. If a rail vehicle 19 passes from the left side to the right side of the figure, the first sensor 23 will detect a wheel 25 of the rail vehicle 19 before the second sensor 24. A sub-evaluation unit 26 is connected with the position sensor 11. The sub-evaluation unit 26 provides an output signal A of the first sensor 23 and an output signal B of the second sensor 24. In the bottom of FIG. 2A output signals A and B are plotted over the time t. It is shown that the first sensor 23 detects the passing rail vehicle 19 before the second sensor 24.

Figure 2B:
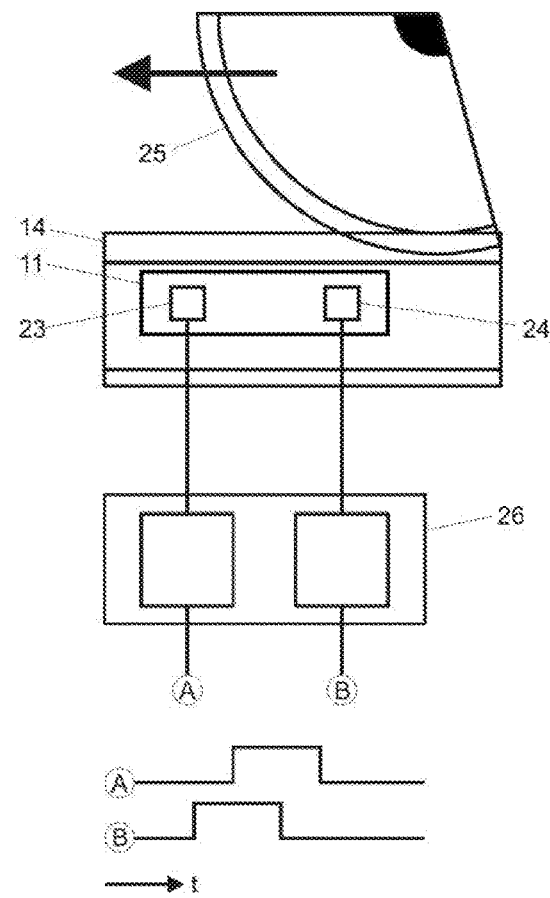

FIG. 2B shows the same exemplary embodiment of a position sensor 11 as in FIG. 2A. In FIG. 2B the passing rail vehicle 19, however, is moving from the right side to the left side of the figure. Therefore, in this case the second sensor 24 detects the passing rail vehicle 19 before the first sensor 23.

By evaluating the output signals A and B from the first and the second sensor 23, 24 of the position sensor 11, it is possible to determine for example the velocity of a passing rail vehicle 19 at the position of the position sensor 11. It is also possible to determine the direction of travel, the number of axles 27 of the rail vehicle 19, the diameter of the axles 27 and the length of the rail vehicle 19.

Figure 3A:
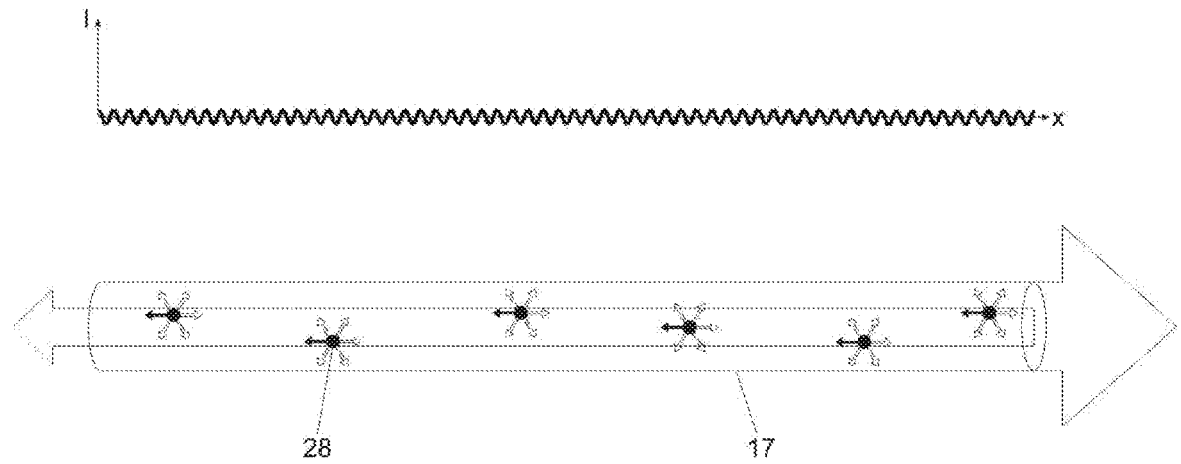
FIGS. 3A, 3B and 3C show the working principle of an exemplary embodiment of a tracking sensor.

FIG. 3A shows an optical fibre 17 with scatter sites 28 which can be, for example, impurities. The optical fibre 17 can be, for example, part of a tracking sensor 12. Light, for example laser light, is fed into the optical fibre 17 and most of the light travels through the whole optical fibre 17 which is indicated by the larger arrow pointing in the direction of x. A small part of the light is reflected back into the opposite direction at the scatter sites 28. The back-scattered light is indicated by the smaller arrow pointing in −x direction. The diagram in the top of FIG. 3A shows the intensity of the back-scattered light plotted over the distance x along the optical fibre 17. In this case, there are no sound waves or vibrations in close proximity to the optical fibre 17 so that the diagram shows only a noise signal.

Figure 3B:
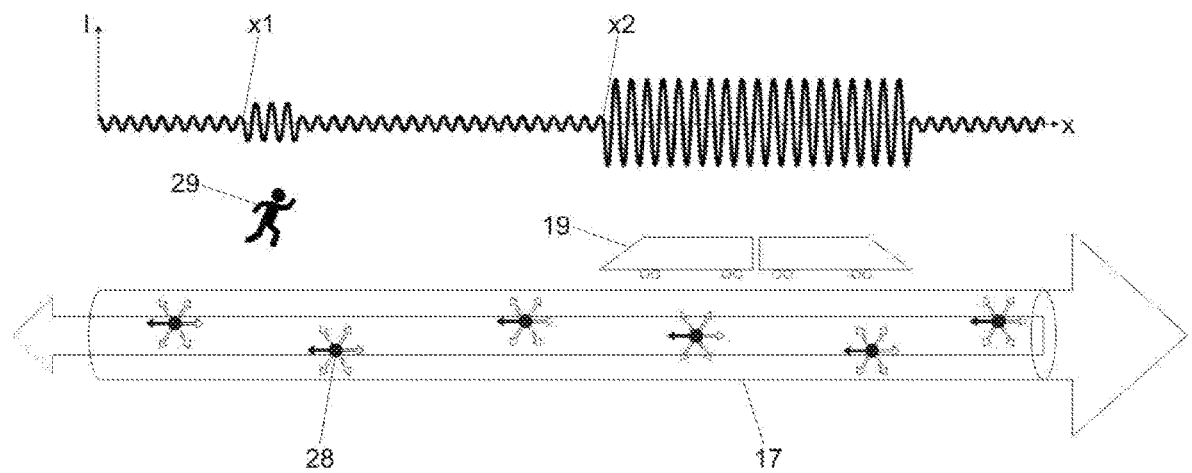

FIG. 3B shows the optical fibre 17 with a rail vehicle 19 and a person 29 moving in close proximity to the optical fibre 17. The sound waves or vibrations caused by the moving rail vehicle 19 and the moving person 29 slightly bend the optical fibre 17 at their respective position such that a larger portion of the light in the optical fibre 17 is back-scattered. Consequently, the intensity of the back-scattered signal is increased at the position x1 where the person 29 is moving. The intensity of the back-scattered signal is also increased at the position x2 where the rail vehicle 19 is moving. Since the intensity of the back-scattered signal is plotted over the distance x along the optical fibre 17 which is arranged along the railway track 14, the position of the person 29 and the rail vehicle 19 along the railway track 14 can be determined. It is also possible to locate other noise in close proximity to the optical fibre 17 such as, for example, working parties, animals or environmental events such as rock falls and landslides.

Figure 3C:
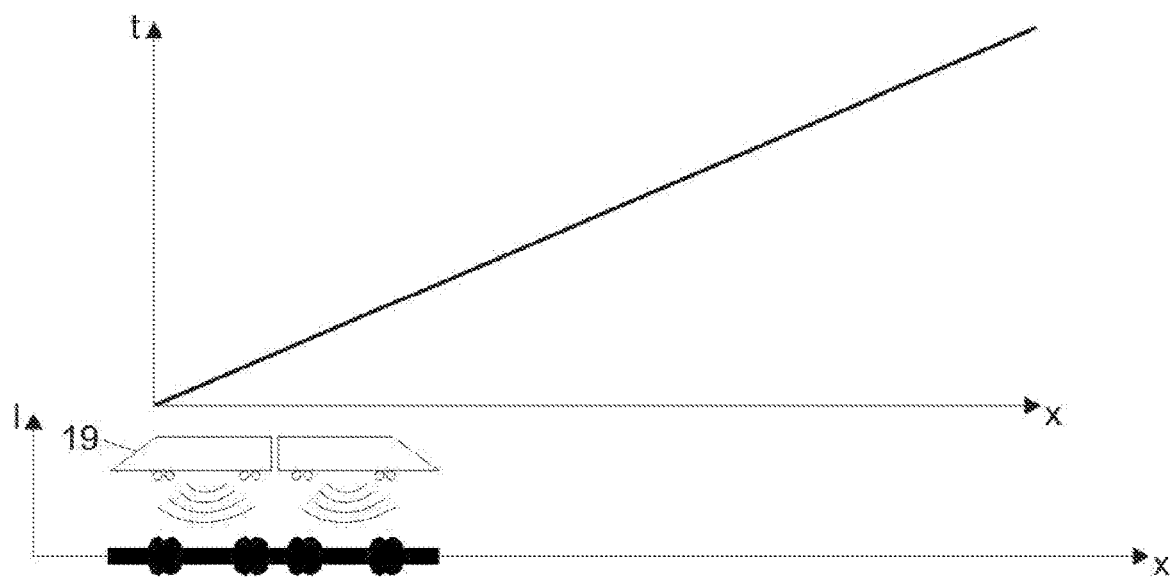

The top diagram in FIG. 3C shows for each time t where the rail vehicle 19 is positioned along the railway track 14. The bottom diagram in FIG. 3C shows the intensity of the back-scattered signal in the optical fibre 17 along the direction x along the railway track 14. At the position of the rail vehicle 19 the intensity of the back-scattered signal is increased.

Figure 4:
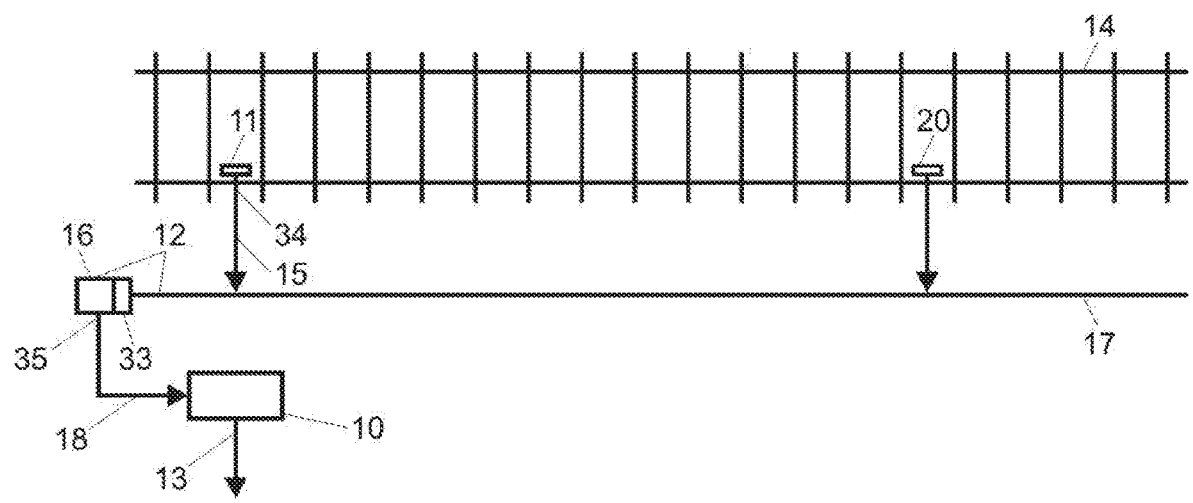
FIG. 4 shows shows an exemplary embodiment of the sensor arrangement for railway monitoring with two positions sensors.

FIG. 4 shows an exemplary embodiment of the sensor arrangement for railway monitoring wherein two position sensors 11, 20 are connected to the optical fibre 17. In this embodiment data detected by the position sensors 11, 20 is transmitted to the evaluation unit 10 via the optical fibre 17. Therefore, the position sensors 11, 20 are connected with the evaluation unit 10 via the tracking sensor 12. The data detected by the position sensors 11, 20 can, for example, be transmitted to the optical fibre 17 by an electrically controlled piezo element. The data detected by the position sensors 11, 20 can be encoded, for example, by frequency modulation, before transmitting the data via the optical fibre 17. The data can be encoded in order to transmit more information.

Figure 5A:
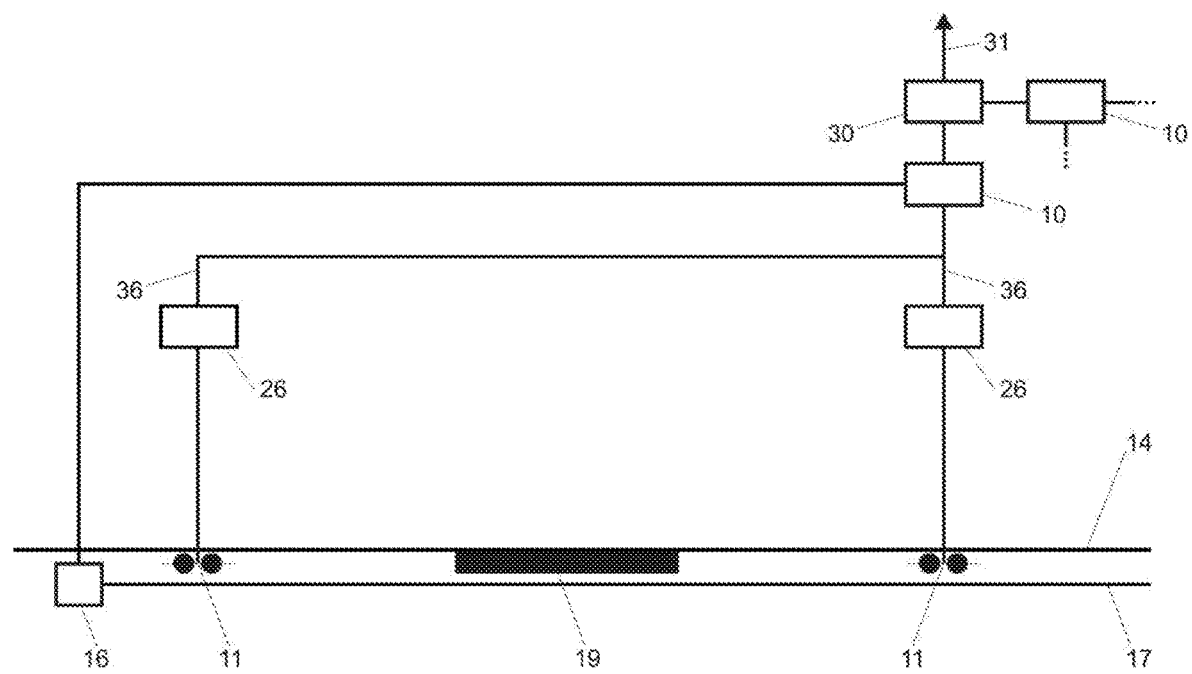
FIG. 5A shows an exemplary embodiment of the sensor arrangement for railway monitoring with one railway track.

FIG. 5A shows an exemplary embodiment of the sensor arrangement for railway monitoring with one railway track 14. Along the railway track 14 two position sensors 11, each comprising two sensors 23, 24, are arranged. Between the two position sensors 11 a rail vehicle 19 is positioned. Furthermore, an optical fibre 17 is arranged along the railway track 14. A fibre optic sensor 16 is arranged at the optical fibre 17. The position sensors 11 are each connected with a sub-evaluation unit 26. The two sub-evaluation units 26 comprise sub-evaluation unit outputs 36. The two sub-evaluation units 26 and the tracking sensor 12 are connected with the evaluation unit 10. Therefore, the two position sensors 11 are connected with the evaluation unit 10 via the sub-evaluation units 26. An application unit 30 can be connected with the evaluation unit 10 and a further evaluation unit 10. The application unit 30 can comprise an application unit output 31. The two sub-evaluation units 26 can evaluate the position output signals 15 of the two position sensors 11. With this, it is possible to provide the information if a rail vehicle 19 is positioned between the two position sensors 11. The evaluation unit 10 combines the position output signals 15 and the tracking output signal 18. Thus, the evaluation unit 10 can provide the current position of a rail vehicle 19 on the railway track 14. The application unit 30 can evaluate information provided by at least two evaluation units 10.

Figure 5B:
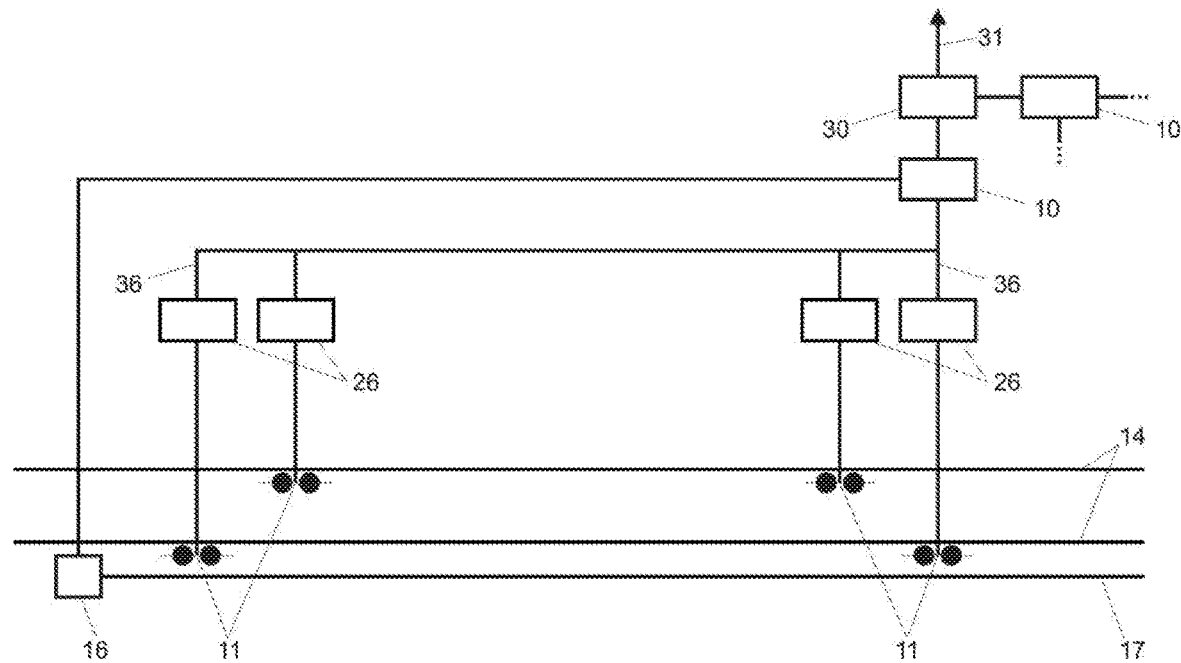
FIG. 5B shows an exemplary embodiment of the sensor arrangement for railway monitoring with two railway tracks.

FIG. 5B shows an exemplary embodiment of the sensor arrangement for railway monitoring with two railway tracks 14 arranged in parallel. Two position sensors 11 comprising two sensors 23, 24 each are arranged at each of the two railway tracks 14. Each position sensor 11 is connected with a sub-evaluation unit 26. One optical fibre 17 is arranged along the two railway tracks 14. In this embodiment it is not clearly possible to determine on which railway track 14 a rail vehicle 19 is moving by only evaluating the tracking output signal 18. Therefore, the evaluation unit 10 combines the four position output signals 15 and the tracking output signal 18 in order to provide the current position of a rail vehicle 19 on the railway track 14.

Figure 6A:
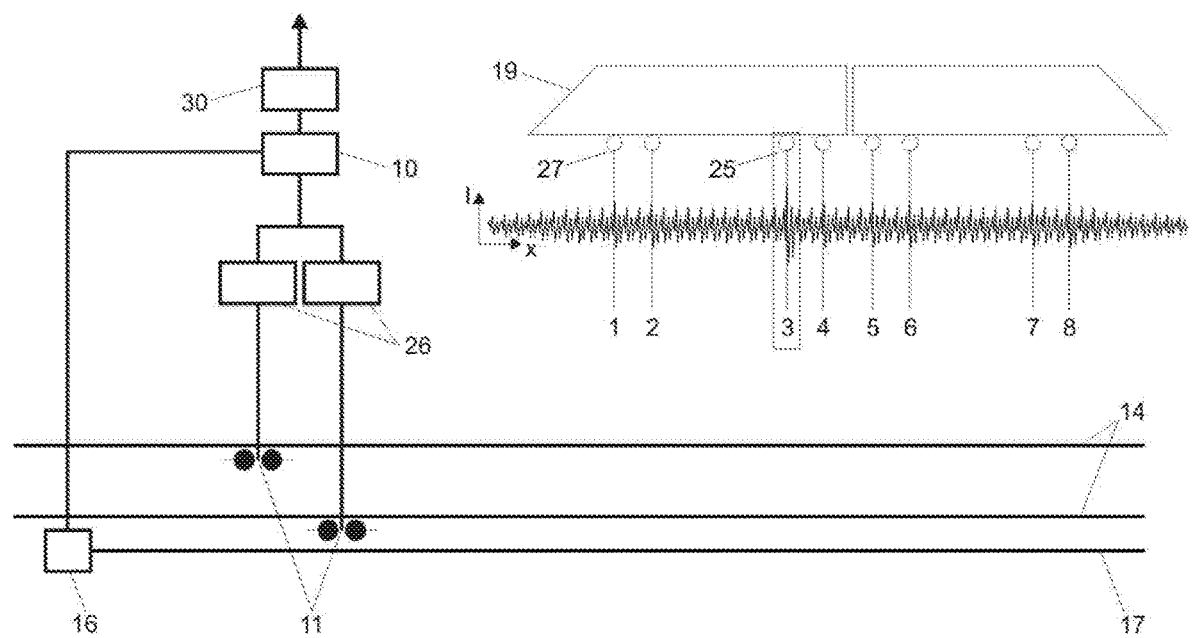
FIG. 6A shows an exemplary embodiment of the sensor arrangement for railway monitoring with two railway tracks and it shows an exemplary tracking output signal.

FIG. 6A shows an exemplary embodiment of the sensor arrangement for railway monitoring with two railway tracks 14 arranged in parallel. Exemplarily, one position sensor 11 is arranged at each railway track 14. An optical fibre 17 is arranged along the railway track 14. The diagram in FIG. 6A shows the intensity of the back-scattered signal of the optical fibre 17 plotted over the distance x along the railway track 14. The positions 1 to 8 in the back-scattered signal with an increased intensity can be correlated with the axles 27 of a moving rail vehicle 19. As highlighted at position 3, the intensity is further increased in comparison to the other positions indicating, for example, a wheel flat at the respective wheel 25 at the rail vehicle 19.

Figure 6B:
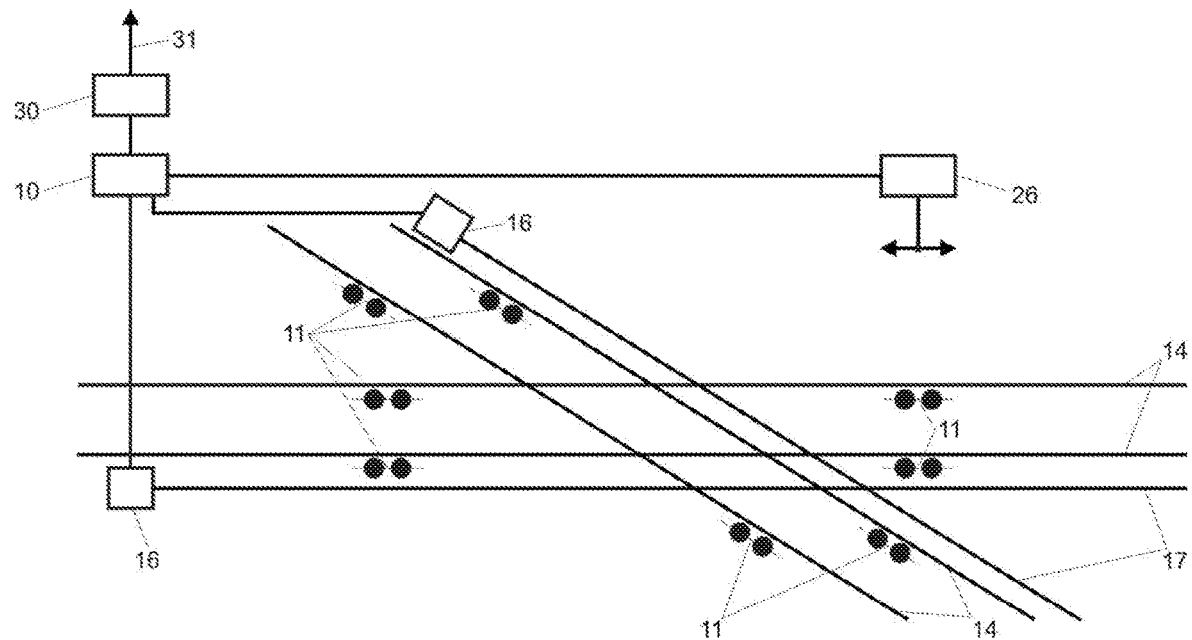
FIG. 6B shows an exemplary embodiment of the sensor arrangement for railway monitoring with four railway tracks crossing each other.

FIG. 6B shows an exemplary embodiment of the sensor arrangement for railway monitoring with four railway tracks 14 crossing each other. Two railway tracks 14 each are arranged in parallel. Around the crossing of the railway tracks 14 position sensors 11 are arranged at each railway track 14. Furthermore, for every two parallel railway tracks 14 one optical fibre 17 is arranged along the railway tracks 14. Two fibre optic sensors 16 are connected with an evaluation unit 10. All position sensors 11 are connected with a sub-evaluation unit 26 which is not shown, but only indicated by the two arrows below the evaluation unit 10. The evaluation unit 10 is connected to an application unit 30. Monitoring the crossing of the four railway tracks 14 with the position sensors 11 and the tracking sensors 12 enables safe traffic along the crossing.

Figure 6C:
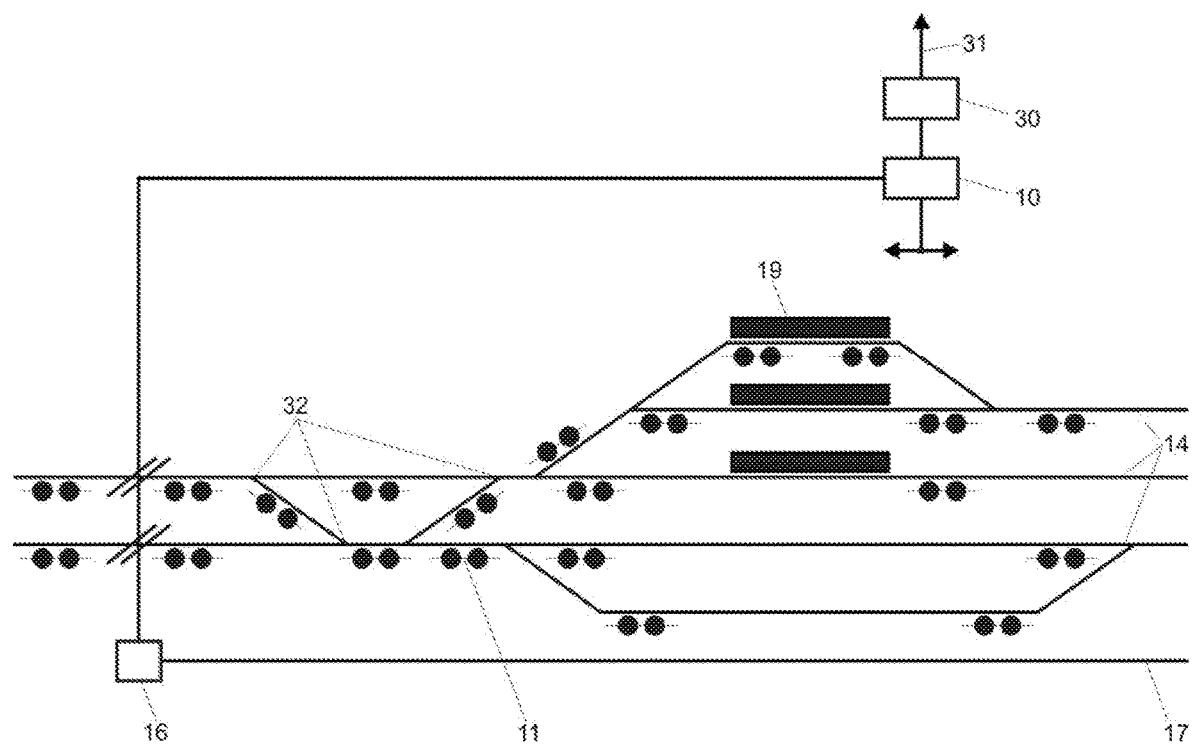
FIG. 6C shows an exemplary embodiment of the sensor arrangement for railway monitoring with several railway tracks within a station.

FIG. 6C shows an exemplary embodiment of the sensor arrangement for railway monitoring with several railway tracks 14 and several turnouts 32. Several railway tracks 14 are arranged in parallel and connected by turnouts 32, as for example within a station. One optical fibre 17 is arranged along the railway tracks 14. Position sensors 11 are arranged in front of and behind each turnout 32 and on each railway track 14. Each position sensor 11 is connected with the evaluation unit 10, which is not shown but only indicated by the two arrows below the evaluation unit 10. With this arrangement it is possible to determine which sections of a station are occupied by a rail vehicle 19 and which sections are clear of a rail vehicle 19.

We claim:

1. A sensor arrangement for railway monitoring, comprising:
    an evaluation unit;
    two different types of sensors, wherein one of the types of sensors is at least one position sensor with a position sensor output; and
    the other type of the sensors is at least one tracking sensor with a tracking sensor output,
    wherein the evaluation unit comprises:
        a connection to the position sensor which is capable of detecting rail vehicles passing over the position of the position sensor on a railway track and providing a position output signal, and
        a connection to the tracking sensor which comprises a fibre optic sensor, which is capable of detecting the position of noise along the railway track and which provides a tracking output signal,
    wherein the evaluation unit is configured to determine and use a diameter of a wheel of one of the rail vehicles,
    wherein the evaluation unit provides an output signal that depends on the position output signal and the tracking output signal,
    wherein the evaluation unit is connected to the position sensor output and the tracking sensor output,
    wherein the position sensor comprises one or more of the following:
        an inductive sensor, a capacitive sensor,
a mechanical sensor,
or
a radar sensor.

2. The sensor arrangement for railway monitoring according to claim 1, wherein the evaluation unit is capable of providing the current position of a rail vehicle on the railway track by combining the information provided by the position output signal and the tracking output signal.

3. The sensor arrangement for railway monitoring according to claim 1, wherein the evaluation unit provides the information on which railway track a rail vehicle is moving in case of more than one railway track arranged in parallel, each railway track having at least one position sensor assigned thereto.

4. The sensor arrangement for railway monitoring according to claim 1, wherein the evaluation unit provides information about at least one of the following:
  current position of a rail vehicle between at least two predefined positions,
  current position of a rail vehicle within a specific section of the railway track,
  current velocity of a rail vehicle,
  current acceleration of a rail vehicle,
  current direction of travel of a rail vehicle,
  position of a wheel flat of a rail vehicle,
  position of a rail break along the railway track the rail vehicle is moving on,
  position of other noise or vibrations along the railway track the rail vehicle is moving on,
  on which railway track the rail vehicle is moving in case of more than one railway track arranged in parallel,
  the number of axles of the rail vehicle,
  the diameter of the axles of the rail vehicle,
  the length of the rail vehicle, or
  the temperature at the position of the position sensor.

5. The sensor arrangement for railway monitoring according to claim 1, wherein the evaluation unit provides a further output signal that depends only on the position output signal of at least one position sensor.

6. The sensor arrangement for railway monitoring according to claim 1, wherein the fibre optic sensor detects light backscattered in an optical fibre, and
  wherein the backscattered signal indicates the position of noise along the optical fibre such that the position of a rail vehicle on the railway track and of other noise on or along the railway track can be determined.

7. The sensor arrangement for railway monitoring according to claim 1, wherein the tracking sensor comprises a distributed acoustic sensor.

8. The sensor arrangement for railway monitoring according to claim 1, wherein the tracking sensor comprises a pulsed signal source and/or an optical fibre, and
  wherein data detected by the position sensor is transmitted to the evaluation unit via the optical fibre.

9. The sensor arrangement for railway monitoring according to claim 1, wherein in the tracking sensor a test signal is fed into an optical fibre and the test signal is evaluated in order to provide a status indicator.

10. The sensor arrangement for railway monitoring according to claim 1, comprising at least two sub-evaluation units providing at least one output signal each,
  wherein
    each sub-evaluation unit is connected with a position sensor,
    at least one position sensor is connected to the evaluation unit via a sub-evaluation unit,
    the sub-evaluation unit outputs are connected with each other, of which at least one is bi-directional, and
    at least one sub-evaluation unit provides a combined output signal which depends on the output signals of the at least two sub-evaluation units and the at least one sub-evaluation unit is connected to the evaluation unit.

11. The sensor arrangement for railway monitoring according to claim 1, comprising
  at least two evaluation units, and
  an application unit, which
    is connected to outputs of the at least two evaluation units,
    comprises at least one application unit output, and
    evaluates the information provided by the at least two evaluation units.

12. The sensor arrangement for railway monitoring according to claim 6, wherein the light that the fibre optic sensor detects is laser light.

13. A method for evaluation of railway monitoring signals, comprising the following steps:
  detecting a passing rail vehicle at at least one position along a railway track by a position sensor providing at least one position output signal, wherein the position sensor is configured to determine and use a diameter of a wheel of the rail vehicle;
  detecting the position of noise and the rail vehicle along the railway track with a tracking sensor, the tracking sensor comprising a fibre optic sensor and an optical fibre which is arranged along the railway track such that the tracking sensor is capable of detecting the position of noise along the railway track and the tracking sensor providing a tracking output signal; and
  providing the current position of the rail vehicle by combining the position output signal and the tracking output signal,
  wherein the position sensor comprises one or more of the following:
    an inductive sensor,
    a capacitive sensor,
    a mechanical sensor,
    or
    a radar sensor,
    and wherein the position sensor and the tracking sensor are different types of sensors.

14. The method for evaluation of railway monitoring signals according to claim 13, wherein the position sensor comprises two sensors capable of detecting the direction of travel of rail vehicles passing over the position of the position sensor.

15. The method for evaluation of railway monitoring signals according to claim 13, wherein at least one of the following features can be provided by an evaluation unit:
  current position of a rail vehicle between at least two predefined positions,
  current position of a rail vehicle within a specific section of the railway track,
  current velocity of a rail vehicle,
  current acceleration of a rail vehicle,
  current direction of travel of a rail vehicle,
  position of a wheel flat of a rail vehicle,
  position of a rail break along the railway track the rail vehicle is moving on,
  position of other noise or vibrations along the railway track the rail vehicle is moving on,
  on which railway track the rail vehicle is moving in case of more than one railway track arranged in parallel, the number of axles of the rail vehicle,
the diameter of the axles of the rail vehicle,
the length of the rail vehicle, or
the temperature at the position of the position sensor.

16. A sensor arrangement for railway monitoring, comprising:
an evaluation unit;
at least one position sensor with a position sensor output; and
at least one tracking sensor with a tracking sensor output,
wherein the evaluation unit comprises:
a connection to the position sensor which is capable of detecting rail vehicles passing over the position of the position sensor on a railway track and providing a position output signal, and
a connection to the tracking sensor which comprises a fibre optic sensor, which is capable of detecting the position of noise along the railway track and which provides a tracking output signal,
wherein the evaluation unit is configured to determine and use a diameter of a wheel of one of the rail vehicles,
wherein the evaluation unit provides an output signal that depends on the position output signal and the tracking output signal,
wherein the evaluation unit is connected to the position sensor output and the tracking sensor output,
wherein the position sensor and the tracking sensor are different types of sensors,
wherein the tracking sensor comprises a pulsed signal source and/or an optical fibre, and wherein data detected by the position sensor is transmitted to the evaluation unit via the optical fibre,
wherein the data detected by the position sensor is encoded by frequency modulation before transmitting the data via the optical fibre, and
wherein the position sensor comprises one or more of the following:
an inductive sensor,
a capacitive sensor,
a mechanical sensor, or
a radar sensor.

* * * * *